US009623957B2

(12) United States Patent
Bleazard (10) Patent No.: US 9,623,957 B2
(45) Date of Patent: Apr. 18, 2017

(54) TORQUE TUBE DOOR (71) Applicant: The Boeing Company, Chicago, IL (US)

(72) Inventor: Mark Bleazard, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 104 days.

(21) Appl. No.: 14/469,543

(22) Filed: Aug. 26, 2014

(65) Prior Publication Data

US 2016/0059952 A1 Mar. 3, 2016

(51) Int. Cl.
*B64C 3/50* (2006.01)
*B64C 9/36* (2006.01)
*B64C 7/00* (2006.01)
*B64C 9/16* (2006.01)
*B64C 9/18* (2006.01)

(52) U.S. Cl.
CPC .............. *B64C 9/36* (2013.01); *B64C 7/00* (2013.01); *B64C 9/16* (2013.01); *B64C 9/18* (2013.01)

(58) Field of Classification Search
None
See application file for complete search history.

(56) References Cited

U.S. PATENT DOCUMENTS

| 2,920,844 | A | * | 1/1960 | Marshall | B64C 23/00 244/130 |
| 3,356,317 | A | * | 12/1967 | Bird | B64C 3/40 244/129.1 |
| 3,594,851 | A | * | 7/1971 | Swatton | B64C 9/02 16/276 |
| 3,921,942 | A | * | 11/1975 | Bracka | B64C 9/16 244/87 |
| 4,034,939 | A | | 7/1977 | Ridley, Jr. et al. | |
| 4,131,252 | A | * | 12/1978 | Dean | B64C 9/16 244/130 |
| 4,352,454 | A | * | 10/1982 | Ewing | F24H 6/00 126/101 |
| 4,471,925 | A | * | 9/1984 | Kunz | B64C 9/00 244/130 |
| 4,576,347 | A | | 3/1986 | Opsahl | |
| 4,979,702 | A | * | 12/1990 | Franklin | A44B 19/26 24/385 |
| 6,170,781 | B1 | * | 1/2001 | Sherrill | B64C 1/14 244/129.5 |
| 6,189,833 | B1 | * | 2/2001 | Ambrose | B64C 1/1407 244/118.3 |
| 7,059,563 | B2 | * | 6/2006 | Huynh | B64C 9/16 244/226 |
| 7,264,206 | B2 | * | 9/2007 | Wheaton | B64C 7/02 244/210 |
| 7,300,021 | B2 | * | 11/2007 | Voogt | B64C 7/00 244/213 |

(Continued)

OTHER PUBLICATIONS

European Patent Office, Extended European Search Report regarding European Patent Application No. 15175418.1, Jan. 4, 2016, 6 pages.

*Primary Examiner* — Medhat Badawi
(74) *Attorney, Agent, or Firm* — Kolisch Hartwell, P.C.

(57) ABSTRACT

A torque tube door and related method steps may include a door coupled to an inboard wing flap, such that the door is movable with the flap to selectively cover and uncover a torque tube opening in an aircraft fuselage.

20 Claims, 5 Drawing Sheets

(56) References Cited

U.S. PATENT DOCUMENTS

| | | | |
|---|---|---|---|
| 7,309,043 B2* | 12/2007 | Good | B64C 9/16 244/99.2 |
| 7,322,547 B2* | 1/2008 | Konings | B64C 3/50 244/214 |
| 7,331,548 B1* | 2/2008 | Simkulet | B64C 5/02 244/220 |
| 7,338,018 B2* | 3/2008 | Huynh | B64C 9/16 244/215 |
| 7,357,358 B2* | 4/2008 | Lacy | B64C 9/24 244/198 |
| 7,367,530 B2* | 5/2008 | Harrigan | B64C 9/146 244/184 |
| 7,424,350 B2* | 9/2008 | Speer | B64C 13/24 244/225 |
| 7,475,854 B2* | 1/2009 | Lacy | B64C 9/16 244/212 |
| 7,494,094 B2* | 2/2009 | Good | B64C 3/50 244/215 |
| 7,500,641 B2* | 3/2009 | Sakurai | B64C 9/16 244/215 |
| 7,506,842 B2* | 3/2009 | Jones | B64C 13/40 244/226 |
| 7,578,484 B2* | 8/2009 | Fox | B64C 9/22 244/214 |
| 7,611,099 B2* | 11/2009 | Kordel | B64C 7/00 244/131 |
| 7,708,231 B2* | 5/2010 | Lacy | B64C 9/16 244/211 |
| 7,721,999 B2* | 5/2010 | Voogt | B64C 7/00 244/213 |
| 7,744,034 B2 | 6/2010 | Coughlin | |
| 7,766,282 B2* | 8/2010 | Kordel | B64C 9/02 244/201 |
| 8,382,045 B2* | 2/2013 | Manley | B64C 9/16 244/213 |
| RE44,313 E * | 6/2013 | Kelley-Wickemeyer | B64C 3/10 244/123.1 |
| 8,474,762 B2* | 7/2013 | Peirce | B64C 9/22 244/213 |
| 8,622,350 B1* | 1/2014 | Hoffenberg | B64C 9/26 244/213 |
| 9,193,447 B2* | 11/2015 | Chow | B64C 25/10 |
| 2006/0145013 A1* | 7/2006 | Gomez | B64C 9/02 244/130 |
| 2006/0169848 A1* | 8/2006 | Libby | B64C 3/50 244/216 |
| 2008/0072502 A1* | 3/2008 | Skaggs | E02D 29/12 52/20 |
| 2008/0265102 A1* | 10/2008 | Larssen | B64C 7/00 244/203 |
| 2009/0026317 A1 | 1/2009 | Coughlin | |
| 2009/0146000 A1* | 6/2009 | Bushnell | B64C 9/02 244/46 |
| 2011/0226345 A1* | 9/2011 | Bushnell | B64C 9/02 137/15.01 |
| 2015/0083867 A1* | 3/2015 | Moser | B64C 13/00 244/214 |

* cited by examiner

- COVER TORQUE TUBE OPENING USING COVERING MEMBER ATTACHED TO FLAP — 102
- SEAL OPENING BY CONTACTING SEAL WITH EDGE OF COVERING MEMBER — 104
- MOVE MEMBER BY MOVING WING FLAP — 106

TORQUE TUBE DOOR

CROSS-REFERENCES

The following related applications and materials are incorporated herein, in their entireties, for all purposes: U.S. Pat. Nos. 4,576,347 and 7,744,034.

FIELD

This disclosure relates to commercial aircraft. More specifically, the disclosed embodiments relate to systems and methods for selectively covering a torque tube opening in a fuselage.

INTRODUCTION

Torque tube members may be used in aircraft to move flaps from a stowed or neutral position to a deployed position. Such torque tube members may penetrate the wing fairing of the fuselage. To accommodate flap motion, an opening may be created in the fuselage which must be closed or covered during the cruise portion of flight.

SUMMARY

The present disclosure provides a torque tube door and related method steps. In some embodiments, an assembly for covering a torque tube opening of an aircraft may include a fuselage having an opening configured to receive a torque member; a wing connected to the fuselage, the wing including a flap adjacent to the fuselage; and a door coupled to and movable with the flap such that the door covers the opening when the flap is in a first position.

In some embodiments, a wing flap for an aircraft may include a wing flap body having an inboard end portion; a torque member coupled to the wing flap body; and a door attached to the inboard end portion of the wing flap body; wherein a portion of the door extends transversely beyond the wing flap body.

In some embodiments, a method for selectively covering an opening in an aircraft fuselage may include: when a wing flap is in a first position, covering a torque tube opening in a fuselage adjacent to the wing flap using a covering member coupled to the wing flap; and moving the covering member to at least partially uncover the opening in the fuselage by repositioning the wing flap to a second position.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIGS. 9A though 9D show a sectional view of an illustrative torque tube door in four respective positions relative to a torque tube opening seal and fuselage.

DESCRIPTION

Overview

Various aspects and embodiments of a torque tube door are described below and illustrated in the associated drawings. Unless otherwise specified, the torque tube door and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other torque tube doors or aircraft systems. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

Generally, each inboard wing flap on a commercial aircraft includes two driven or actuated flap supports. In some examples, one of these flap supports is located inside the fuselage just aft of the landing gear. This location of the flap support facilitates elimination of a flap support fairing, which would be a source of drag. However, this configuration requires a torque tube to connect the flap and the driven flap support. The torque tube is referred to as a torque tube because it has a high torsional load.

A torque tube door may include a covering member attached to an inboard end portion of a wing flap, such that the door covers a torque tube opening in an adjacent fuselage when the wing flap is in a substantially neutral position. The covering member may be attached to an inboard end portion (also referred to as a proximal portion) of the wing flap using brackets or other mounting hardware. A sealing member may be disposed along at least a portion of the torque tube opening, to facilitate aerodynamic sealing of the components.

Because the torque tube door is attached to the wing flap, the door is movable with the flap. Accordingly, lowering of the flaps will cause the door to reposition and uncover the torque tube opening as the door slides down outside the fuselage and away from the opening. A torque tube passes through the opening to operatively connect the wing flap to equipment inside the fuselage. This torque tube translates along a path, such as travelling along an arcing or curvilinear path, when the flap is repositioned. Uncovering of the opening thus allows the torque tube to move along the path unimpeded.

Examples, Components, and Alternatives

The following examples describe selected aspects of exemplary torque tube doors as well as related systems and/or methods. These examples are intended for illustration and should not be interpreted as limiting the entire scope of the present disclosure. Each example may include one or more distinct inventions, and/or contextual or related information, function, and/or structure.

Example 1

Figure 1:
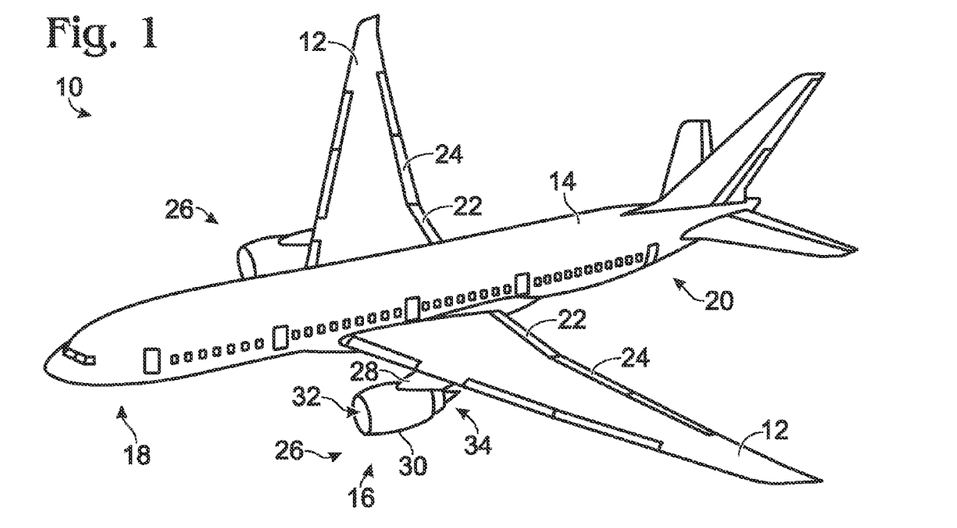
FIG. 1 is a perspective view of an illustrative commercial aircraft.

This example describes an illustrative aircraft suitable for use with aspects of the present disclosure; see FIG. 1.

FIG. 1 is a perspective view of an illustrative commercial jet aircraft 10 having wings 12, a fuselage 14, and a propulsion system 16. Fuselage 14 includes a nose portion 18 at the forward end of the fuselage, and a tail portion 20 at the aft end of the fuselage.

Wings 12 may include any suitable airfoil structures configured to provide lift to the aircraft. Wings 12 are shown in FIG. 1 as elongate structures extending from a lower portion of fuselage 14 in a swept wing, tapered planform. In other examples, wings may be straight or delta-shaped. In other examples, wings may be trapezoidal, constant, elliptical, semi-elliptical, or other configurations known in the art. Wings 12 may include control surfaces such as ailerons and flaps. For example, an inboard flap 22 and an outboard flap 24 may be included on each wing. Flaps may include any suitable pivoting structure on the trailing edge of a wing, and may be configured to alter the lift characteristics of the wing. Flaps may be pivotable about a fixed axis. In other examples, flaps may pivot through an arc.

Fuselage 14 is the main body of the aircraft, and may include any suitable central structure configured to hold a crew, one or more passengers, and/or cargo. FIG. 1 shows an elongate, generally cylindrical fuselage configured for carrying passengers.

Propulsion system 16 may include two turbofan engines 26, shown in FIG. 1 attached to wings 12 by pylons 28. In other embodiments, engines 26 may be carried or attached to fuselage 14 or other aircraft structures such as tail portion 20. More or fewer engines may be included, and other types of engines (e.g., turboprop) may be used. In the example shown, each engine 26 is housed in a nacelle 30, which includes an inlet 32 and a nozzle portion 34.

Example 2

This example describes an illustrative torque tube door suitable for use with aspects of the present disclosure; see FIGS. 2 through 9D.

Figure 2:
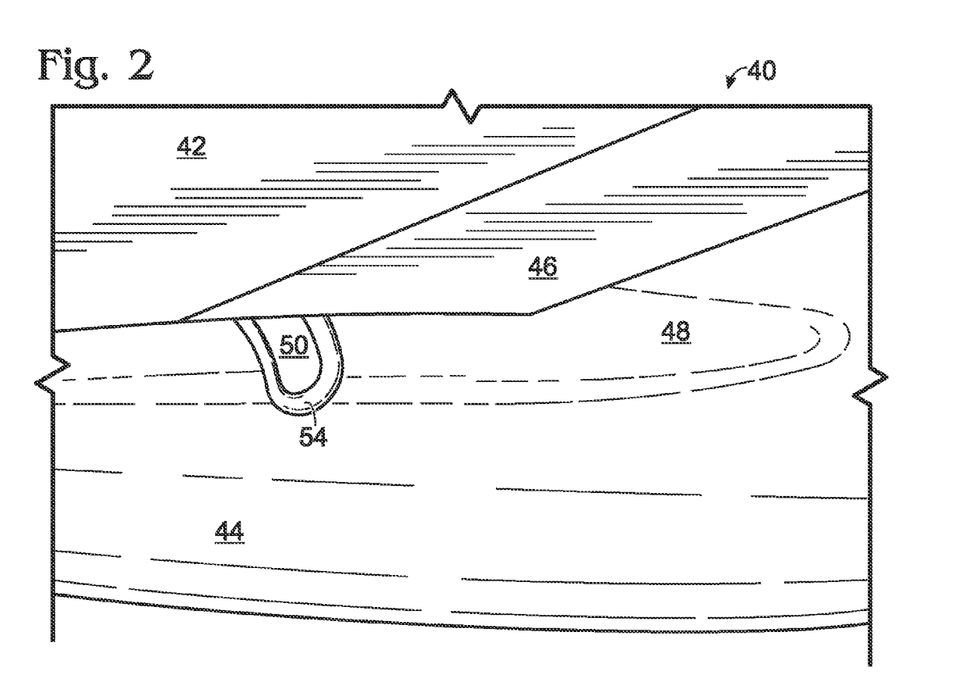
FIG. 2 is a partial side view of an illustrative aircraft wing and fuselage, taken from under the wing and showing an opening in the fuselage for the torque tube of an inboard flap.

FIG. 2 is a partial side view of an aircraft 40 similar to aircraft 10, taken from under a port-side wing 42 and showing a fuselage 44 of the aircraft. Wing 42 includes an inboard flap 46, shown in FIG. 2 adjacent to a wing fairing portion 48 of fuselage 44. Flap 46 may be configured to pivot and translate through an arc as the flap moves between a raised or "flaps up" position to a lowered or "flaps down" position. Furthermore, flap 46 may be actuated or moved between positions by way of a torque member (also referred to as a torque tube) that extends through the fuselage. Accordingly, a torque tube opening 50 is formed in fuselage 44 to accommodate the motion of the torque tube. Opening 50 may be elongate or arcuate to allow a full range of motion for the torque tube and associated flap during operations. Opening 50 may be referred to interchangeably as an aperture, a hole, and/or a window.

Fuselage openings are generally undesirable during flight. Accordingly opening 50 may be covered by a door or other covering member. However, the door must be movable (i.e., the opening must be uncovered) to accommodate flap operation as described above.

Figure 3:
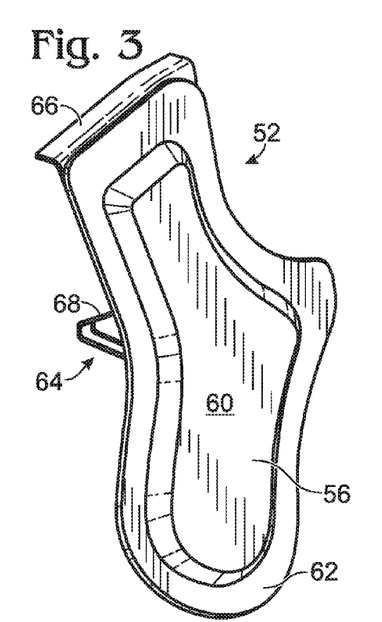
FIG. 3 is an isometric view of an illustrative door for covering a torque tube fuselage opening.
Figure 4:
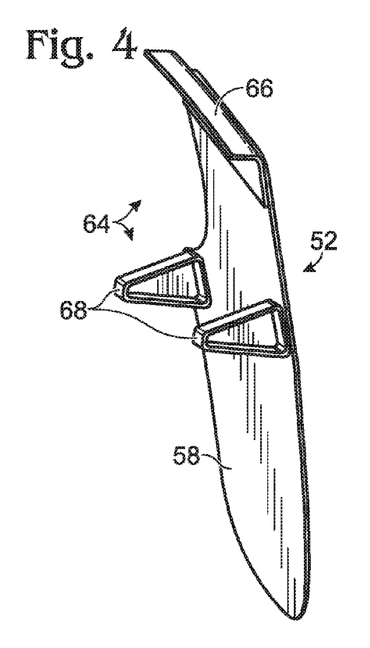
FIG. 4 is an isometric view of the door of FIG. 3, taken from a different vantage point.

FIGS. 3 and 4 show two views of a torque tube door 52 suitable for selectively covering opening 50. Torque tube door 52 may include any suitable structure configured to be coupled to wing flap 46 and to cover opening 50. Torque tube door 52 may be further configured to engage with a sealing member 54 disposed at least partially around an edge of opening 50 as shown in FIG. 2.

Torque tube door 52 may include a generally planar plate shaped to conform to opening 50. One or more surfaces of door 52 may be contoured. Door 52 may be referred to interchangeably as a cover plate, a covering member, a door member, and/or a cover. Door 52 may include a first or inboard major surface 56 and a second or outboard major surface 58. Surface 56 may also be referred to as the inner surface. Surface 58 may also be referred to as the outer or mounting surface. Door 52 may include a central body portion 60. Door 52 may include an outer perimetral flange 62, which may be configured to mate or otherwise engage sealing member 54. Flange 62 may be referred to as a sealing surface. Door 52 may be constructed of any suitable rigid or semi-rigid material.

One or more mounting structures 64, also referred to as mounting hardware and/or fittings, may be attached to outer surface 58. Mounting structures 64 may include any suitable structures configured to facilitate attachment of torque tube door 52 to an end portion of wing flap 46. For example, mounting structures 64 may include an upper bracket 66 and two lower brackets 68. Brackets 66 and 68 may be affixed to torque tube door 52 by any suitable method, such as by riveting, welding, bonding, and/or adhesive, or the like, or any combination thereof. In some examples, one or more brackets such as brackets 66 and 68 may be unitary with door 52.

Figure 5:
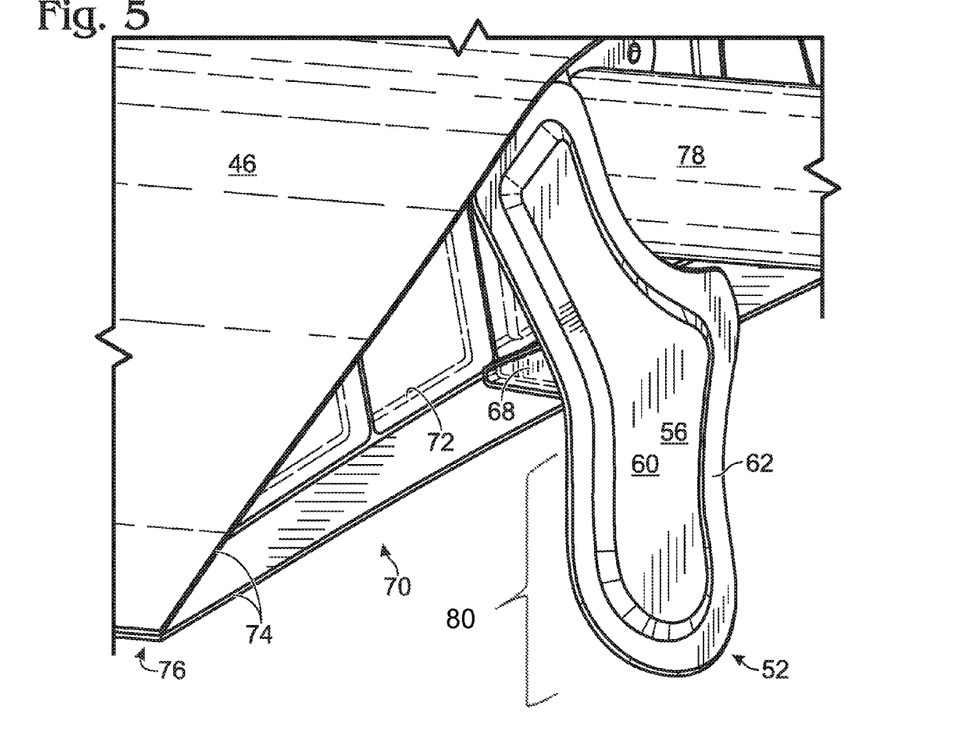
FIG. 5 is an isometric view showing the door of FIG. 3 installed on a proximal end of an illustrative flap.

Turning to FIG. 5, an inboard end portion 70 of wing flap 46 is shown, with torque tube door 52 mounted to the flap using mounting hardware 64. In the embodiment shown, wing flap 46 includes a wing flap body having inner supports 72 (i.e., support structure) and an outer skin 74. Door 52 is disposed between a trailing edge 76 of flap 46 and a torque tube 78, which extends from the support structure. The brackets of door 52 may fit within and attach to inner surfaces of skin 74, using any appropriate method. Mounting structures 64 may be positioned to conform to a portion of the flap when the door is in a suitable position for covering an adjacent opening 50.

In this embodiment, the mounting brackets are affixed to door 52 as well as to flap 46. Accordingly, door 52 is effectively affixed to the flap, and will be movable with the flap. In some examples, door 52 may be unitary with the flap, or may be formed as an extension of the flap support structure and/or skin. As shown in FIG. 5, door 52 may be mounted to the flap such that the major surface of the door is transverse to a long axis of the flap (e.g., generally at a right angle to the long axis), and such that a portion 80 of the door extends transversely from (e.g., hangs below) the flap body. For at least this reason, the door may be described as having an "elephant ear" configuration.

Figure 6:
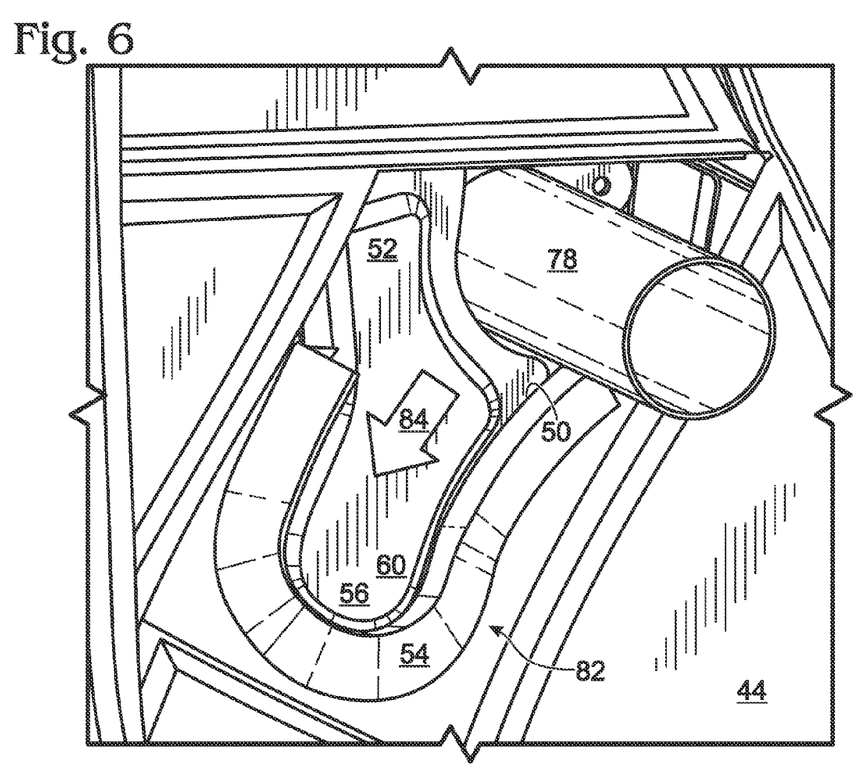
FIG. 6 is an isometric view from inside an illustrative fuselage, showing the door and flap of FIG. 5 substantially sealing a torque tube fuselage opening.

Turning to FIG. 6, the mounted door of FIG. 5 is shown in position covering opening 50 in fuselage 44, as viewed from inside the fuselage. Torque tube 78 extends through the opening and into the interior of fuselage 44. A lower edge portion 82 of opening 50 includes sealing member 54. Sealing member 54, also referred to as a seal, may extend around only a portion of the perimeter of opening 50, as the flap covers an upper portion of the opening, and door sealing may therefore be unnecessary.

Seal 54 may include any suitable structure configured to provide a resilient surface for mating with door 52. For example, seal 54 may include a hollow structure capable of elastic deformation. Seal 54 may comprise a natural material, and/or a synthetic or semi-synthetic polymer. For example, seal 54 may comprise plastic such as PVC. In some examples, seal 54 may include an integrated stiffening portion comprising aluminum and/or fiberglass. In some examples, seal 54 may include a retaining feature for attaching the seal to the fuselage.

An arrow 84 generally indicates the direction torque tube 78 travels when flap 46 moves between first and second positions. Torque tube 78 is shown sectionally in FIG. 6. It should be understood that the tube extends further into fuselage 44 to connect with other equipment not shown. Because door 52 moves with the flap, the door will also move generally in direction 84, albeit along the outside of the fuselage.

Figure 7:
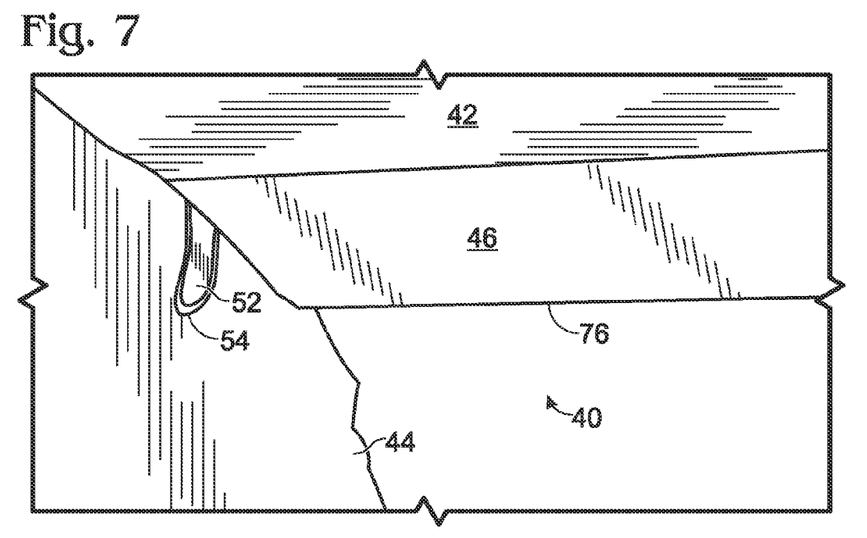
FIGS. 7 and 8 show under-wing views of an illustrative torque tube door coupled to a flap in a first and a second position, respectively.
Figure 8:
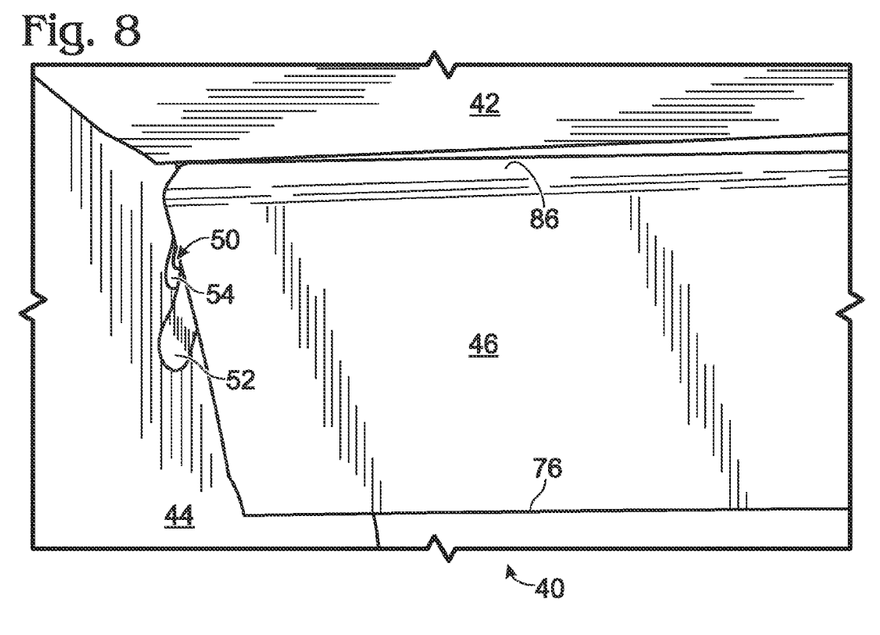
Figure 9:
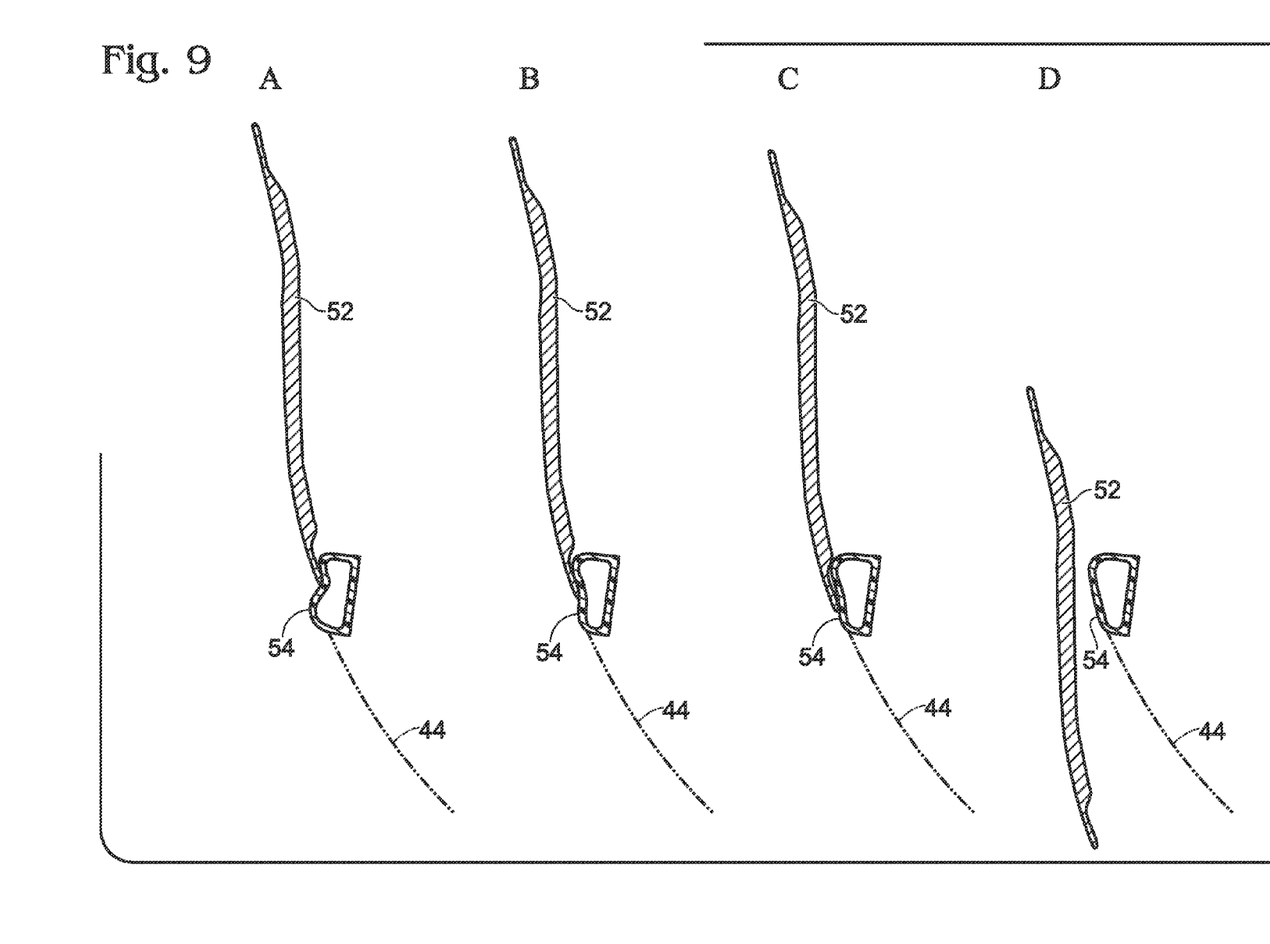

FIGS. 7 and 8 show torque door 52 in operation. FIG. 7 is an under-wing view of aircraft 40 looking aft along fuselage 44, with wing 42 and inboard flap 46 shown in a cruise configuration (i.e., flaps up, first position). Door 52 is covering opening 50, and is engaged with seal 54. Lower portion 80 of door 52 can be seen in FIG. 7, with the remainder of the door obscured by flap 46. Turning to FIG. 8, which is a similar view to that of FIG. 7, flap 46 is shown in a second or down position. In this position, door 52 has moved with flap 46, is no longer covering opening 50, and is no longer engaged with seal 54. Door 52 is now adjacent to an outer surface of fuselage 44. Because flap 46, in this example, travels through an arc when moving from the first to the second position, a leading edge 86 of the flap is visible.

FIGS. 9A through 9D show sectional side views of door 52 in various positions relative to seal 54 and fuselage 44. FIG. 9A shows an edge portion of door 52 in sealing contact with an upper portion of seal 54, thereby deforming the seal in an upper region. FIG. 9B shows the edge portion of door 52 in sealing contact with a middle portion of seal 54, and FIG. 9C shows the edge portion of door 52 in sealing contact with a lower portion of seal 54. Correspondingly different regions of the sealing member are therefore deformed, in each case maintaining door engagement with the seal. FIGS. 9A through 9C are examples of expected flap adjustment during the cruise regime of aircraft flight. For example, a pilot or automatic control system may expect to adjust flaps in the range of plus or minus 1.5 degrees. FIG. 9A shows the door position corresponding to a plus 1.5 degree flap position. FIG. 9B shows the door position corresponding to a zero degree (i.e., neutral) flap position. FIG. 9C shows the door position corresponding to a minus 1.5 degree flap position.

FIG. 9D shows an example of door position when flap 46 is repositioned downward, and the door disengages from the seal and opening. As shown in the drawing, door 52 slides downward outboard of the seal and outside of fuselage 44. A similar location of components is shown in FIG. 8. This repositioning is facilitated by a fuselage that slopes from the sealing surface away from the wing and door, thereby avoiding interference when the door lowers with the flap.

Example 3

Figure 10:
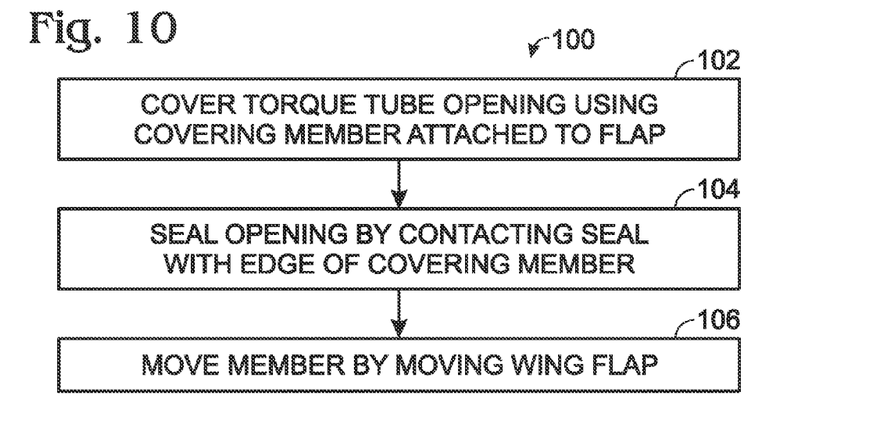
FIG. 10 is a flow chart showing steps performed in an illustrative method for selectively covering a torque tube opening in a fuselage.

This example describes a method for selectively covering a torque tube opening in an aircraft fuselage; see FIG. 10.

FIG. 10 is a flowchart illustrating steps performed in an illustrative method, and may not recite the complete process or all steps of the method. FIG. 10 depicts multiple steps of a method, generally indicated at 100, which may be performed in conjunction with a torque tube door according to aspects of the present disclosure. Although various steps of method 100 are described below and depicted in FIG. 10, the steps need not necessarily all be performed, and in some cases may be performed in a different order than the order shown.

Step 102 includes covering a torque tube opening in a fuselage adjacent to the wing flap using a covering member coupled to the wing flap. This may be done, for example, when a wing flap is in a first position, such as a neutral or "flaps up" position. In some examples, the covering member (also referred to as a door) is affixed to an inboard end portion of the wing flap. A portion of the covering member may extend transversely from the wing flap.

Step 104 may include sealing the torque tube opening when the wing flap is in the first position by causing an edge portion of the covering member to contact a sealing member of the opening.

Step 106 includes moving the covering member to at least partially uncover the opening in the fuselage by repositioning the wing flap to a second position. The second position may be a lowered or "flaps down" position. A torque tube may be moved through a path (e.g., an arcuate path) when repositioning the wing flap to the second position. The torque tube may be attached to the wing flap and pass through the torque tube opening.

Example 4

This section describes additional aspects and features of torque tube doors, presented without limitation as a series of paragraphs, some or all of which may be alphanumerically designated for clarity and efficiency. Some of the paragraphs below expressly refer to and further limit other paragraphs, providing without limitation examples of some of the suitable combinations.

A0. An assembly for covering a torque tube opening of an aircraft, the assembly comprising a fuselage including an opening configured to receive a torque member; a wing connected to the fuselage, the wing including a flap adjacent to the fuselage; and a door coupled to and movable with the flap such that the door covers the opening when the flap is in a first position.

A1. The assembly of paragraph A0, further comprising a sealing member disposed along an edge portion of the opening.

A2. The assembly of paragraph A1, wherein the door includes a central body portion and a perimetral flange portion, the flange portion being configured to form a seal with the sealing member when the flap is in the first position.

A3. The assembly of any preceding paragraph, wherein the torque member is coupled to the wing flap.

A4. The assembly of any preceding paragraph, wherein the door is affixed to an inboard end portion of the flap.

A5. The assembly of any preceding paragraph, wherein the opening in the fuselage has an arcuate shape.

A6. The assembly of any preceding paragraph, wherein the door is further configured to uncover at least a portion of the opening when the flap is in a second position.

A7. The assembly of paragraph A6, wherein the first position is a flaps up position, and the second position is a flaps down position.

B0. A wing flap for an aircraft, the wing flap comprising a wing flap body having an inboard end portion; a torque member coupled to the wing flap body; and a door attached to the inboard end portion of the wing flap body; wherein a portion of the door extends transversely beyond the wing flap body.

B1. The wing flap of paragraph B0, wherein the door is movable with the wing flap, such that the door is configured to selectively cover and uncover an opening in an adjacent fuselage.

B2. The wing flap of paragraph B0, wherein the door comprises a plate affixed to the inboard end portion by one or more rigid brackets.

B3. The wing flap of any one of paragraphs B0-B2, wherein the door is bonded to the wing flap body.

B4. The wing flap of any one of paragraphs B0-B3, wherein the portion of the door extends transversely beyond a lower surface of the wing flap body.

B5. The wing flap of any one of paragraphs B0-B4, wherein an outer edge portion of the door is configured to mate with a sealing member of a fuselage opening.

C0. A method for selectively covering an opening in an aircraft fuselage, the method comprising: when a wing flap is in a first position, covering a torque tube opening in a fuselage adjacent to the wing flap using a covering member coupled to the wing flap; and moving the covering member to at least partially uncover the opening in the fuselage by repositioning the wing flap to a second position.

C1. The method of paragraph C0, wherein the covering member is affixed to an inboard end portion of the wing flap.

C2. The method of paragraph C0 or C1, wherein a portion of the covering member extends transversely from the wing flap.

C3. The method of any one of paragraphs C0-C2, further including sealing the torque tube opening when the wing flap is in the first position by causing an edge portion of the covering member to contact a sealing member of the opening.

C4. The method of any one of paragraphs C0-C3, wherein the first position is a flaps up position, and the second position is a flaps down position.

C5. The method of any one of paragraphs C0-C4, further including moving a torque tube through an arcuate path when repositioning the wing flap to the second position, the torque tube being attached to the wing flap and passing through the torque tube opening.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

I claim:

1. An aircraft comprising:
   a fuselage including an opening configured to receive a torque member;
   a wing connected to the fuselage, the wing including a flap adjacent to the fuselage; and
   a door mounted to and movable with the flap such that the door covers the opening when the flap is in a first position, and uncovers at least a portion of the opening when the flap is in a second position;
   wherein the door is mounted to the flap by a mounting bracket directly attached to both the door and the flap.

2. The aircraft of claim 1, further comprising a sealing member disposed along an edge portion of the opening.

3. The aircraft of claim 2, wherein the door includes a central body portion and a perimetral flange portion, the flange portion being configured to form a seal with the sealing member when the flap is in the first position.

4. The aircraft of claim 1, wherein the torque member is coupled to the wing flap.

5. The aircraft of claim 1, wherein the door is mounted to an inboard end portion of the flap.

6. The aircraft of claim 1, wherein the opening in the fuselage has an arcuate shape.

7. The aircraft of claim 1, wherein the first position is a flaps up position, and the second position is a flaps down position.

8. A wing flap for an aircraft, the wing flap comprising:
   a wing flap body having an inboard end portion;
   a torque member coupled to the wing flap body; and
   a door mounted to the inboard end portion of the wing flap body by one or more brackets each affixed directly to both the door and the inboard end portion of the wing flap body;
   wherein a portion of the door extends transversely beyond the wing flap body.

9. The wing flap of claim 8, wherein the door is movable with the wing flap body, such that the door is configured to selectively cover and uncover an opening in an adjacent fuselage as the door moves with the wing flap body.

10. The wing flap of claim 8, wherein the door is bonded to the wing flap body.

11. The wing flap of claim 8, wherein the portion of the door extends transversely beyond a lower surface of the wing flap body.

12. The wing flap of claim 8, wherein an outer edge portion of the door is configured to mate with a sealing member of a fuselage opening.

13. A method for selectively covering a torque tube opening in an aircraft fuselage, the method comprising:
   when a wing flap is in a first position, covering a torque tube opening in a fuselage adjacent to the wing flap using a covering member mounted by at least one bracket directly to the wing flap; and
   moving the covering member to at least partially uncover the torque tube opening in the fuselage by repositioning the wing flap to a second position.

14. The method of claim 13, wherein the covering member is mounted to an inboard end portion of the wing flap.

15. The method of claim 14, wherein a portion of the covering member extends transversely from the wing flap.

16. The method of claim 13, further including sealing the torque tube opening when the wing flap is in the first position by causing an edge portion of the covering member to contact a sealing member of the opening.

17. The method of claim 13, wherein the first position is a flaps up position, and the second position is a flaps down position.

18. The method of claim 13, further including moving a torque tube through an arcuate path when repositioning the wing flap to the second position, the torque tube being attached to the wing flap and passing through the torque tube opening.

19. The method of claim 13, wherein the at least one rigid bracket includes an upper bracket and two lower brackets.

20. The method of claim 19, wherein the upper bracket and two lower brackets fit within and attach directly to respective inner surfaces of an outer skin of the wing flap.

\* \* \* \* \*